US005642766A

United States Patent [19]
MacCauley, III

[11] Patent Number: 5,642,766
[45] Date of Patent: Jul. 1, 1997

[54] METHOD AND APPARATUS FOR REMOVING SAWDUST

[75] Inventor: William J. MacCauley, III, Atglen, Pa.

[73] Assignee: John Rock & Company, Inc., Downingtown, Pa.

[21] Appl. No.: 567,277

[22] Filed: Dec. 5, 1995

[51] Int. Cl.$^6$ ............................................ B27G 19/00
[52] U.S. Cl. ....................... 144/329; 15/409; 83/98; 83/100; 144/252.1
[58] Field of Search ............................. 144/252.1, 329; 83/22, 98, 99, 100; 408/56–61; 409/137, 295; 15/409; 125/13 R

[56] References Cited

U.S. PATENT DOCUMENTS

| | | | |
|---|---|---|---|
| 2,073,430 | 3/1937 | Tautz | 83/98 |
| 3,669,163 | 6/1972 | Crane | 30/380 |
| 4,018,483 | 4/1977 | Smith | 15/409 |
| 4,022,182 | 5/1977 | Lenkevich | 125/13.12 |
| 4,144,781 | 3/1979 | Kreitz | 83/100 |
| 4,576,072 | 3/1986 | Terpstra et al. | 83/102.1 |
| 4,606,251 | 8/1986 | Boileau | 83/168 |
| 4,813,319 | 3/1989 | Weyand, Jr. | 83/22 |
| 5,072,638 | 12/1991 | Hüser | 83/99 |
| 5,088,363 | 2/1992 | Jones et al. | 83/100 X |
| 5,167,215 | 12/1992 | Harding, Jr. | 83/168 X |
| 5,259,383 | 11/1993 | Cothrell | 83/99 |

OTHER PUBLICATIONS

Brewco, Inc. "Floating Guide That Makes Dust Free Boards" —Patent Pending.
American lumber & Pallet, Jan. 1996, "Floating Guide That Makes Dust Free Boards".

*Primary Examiner*—W. Donald Bray
*Attorney, Agent, or Firm*—Merek & Voorhees

[57] ABSTRACT

The present invention is directed to a system for removing sawdust from the kerf of a workpiece. The system includes a nozzle for directing fluid at a predetermined pressure in the kerf of a workpiece, a pressure source for providing fluid at a predetermined pressure to the nozzle, a vacuum source for suctioning sawdust from the kerf of the workpiece, a support member for removably supporting the nozzle adjacent a saw blade of a multiple head band saw, and means for adjusting the position of the nozzle relative to the workpiece and the saw blade. The nozzle includes first and second ends. The first end is adapted to be positioned in substantially the same horizontal plane as the saw blade. The first end is further suitably sized and shaped to direct air at a predetermined pressure into the kerf of a workpiece. Preferably, the vacuum source is operated at the same time the nozzle directs air under pressure into the kerf.

20 Claims, 6 Drawing Sheets

METHOD AND APPARATUS FOR REMOVING SAWDUST

FIELD OF THE INVENTION

The present invention is directed to a method and apparatus for removing sawdust. More particularly, the present invention is directed to a method and apparatus for removing sawdust from between planks formed by multiple head band saws.

BACKGROUND OF THE INVENTION

Pallets formed of various materials are widely used in industries ranging from food processing to pharmaceutical manufacturers so that various inventory may be readily and efficiently stored. In the process of forming pallets, pallet stock is created by multiple head band saws. Specifically, multiple head band saws process the raw material or workpiece commonly referred to as the cant into multiple vertically stacked planks which are subsequently used to form pallets. More specifically, multi-headed band saws include two or more band saws. The band saws are spaced apart along the direction of travel of the workpiece or cant. The band saws are also oriented at different heights thereby creating multiple, vertically stacked planks once the workpiece has traveled through the multiple headed band saws. It is known to have as many as five saw blades in a multiple head band saw which in turn will create six vertically stacked planks subsequently used in the formation of pallets. While processing the cant or workpiece into multiple, vertically stacked planks, sawdust is created between the confronting faces of adjacent planks. In fact, the sawdust can become somewhat adhered to the confronting faces of adjacent planks during the formation process. Where the multiple headed band saw has five (5) saw blades the sawdust created in processing the cant is considerable due to the fact that five separate cuts are made. The sawdust built up between adjacent planks is extremely undesirable and creates significant problems for various industries employing pallets to store inventory. Specifically, significant amounts of the sawdust residue will remain on the planks even after they have been processed to form pallets. As the pallets are used for storing inventory in the particular industries (e.g., food processing and pharmaceutical manufacturers) the sawdust residue will dislodge from the pallets soiling the surrounding environment or the inventory stored thereon. It will be readily appreciated that it is extremely disadvantageous in virtually every industry to have either the surrounding environment or the inventory soiled with sawdust residue.

One attempt at alleviating the sawdust residue in pallet stock has employed a brushing device in conjunction with multiple head band saws. The brushing device operates on each of the planks to remove the sawdust residue. However, such a device is relatively expensive. Further, previously employed brushing devices cannot keep pace with the multiple head band saws thus considerably slowing down the process of generating pallet stock.

OBJECTS AND SUMMARY OF THE INVENTION

An object of the present invention is to provide a novel and unobvious method and apparatus for removing sawdust generated in processing a workpiece or cant for pallet stock.

Another object of the present invention is to provide a method and apparatus for removing sawdust generated in processing a workpiece or cant for pallet stock without causing any slowing of the operating speed of a multiple head band saw.

A further object of the present invention is to provide a nozzle suitably shaped and sized to direct air under pressure into the kerf of a workpiece to remove sawdust therefrom.

Still a further object of the present invention is to provide an apparatus for removing sawdust which can be readily mounted on conventional multiple head band saws.

Yet still a further object of the present invention is to provide an apparatus which can be mounted on a conventional multiple head band saw to remove sawdust created as the cant or workpiece is being cut to form pallet stock.

These and other objects of the present invention will be readily apparent upon review of the following detailed description of the present invention and the accompanying drawings. These objects of the invention are not exhaustive and are not to be construed as in any way limiting the scope of the claimed invention.

In summary, the present invention, in its preferred form, is directed to a system for removing sawdust from the kerf of a workpiece. The system includes a nozzle for directing fluid at a predetermined pressure in the kerf of a workpiece, a pressure source for providing fluid at a predetermined pressure to the nozzle, a vacuum source for suctioning sawdust from the kerf of the workpiece, a support member for removably supporting the nozzle adjacent a saw blade of a multiple head band saw, and means for adjusting the position of the nozzle relative to the workpiece and the saw blade. The nozzle includes first and second ends. The first end is adapted to be positioned in substantially the same horizontal plane as the saw blade. The first end is further suitably sized and shaped to direct air at a predetermined pressure into the kerf of a workpiece. Preferably, the vacuum source is operated at the same time the nozzle directs air under pressure into the kerf.

DETAILED DESCRIPTION OF THE DRAWINGS

DETAILED DESCRIPTION OF THE INVENTION

The preferred embodiment of the present invention will now be described with reference to FIGS. 1 to 7.

FIGS. 1–7

Figure 1:
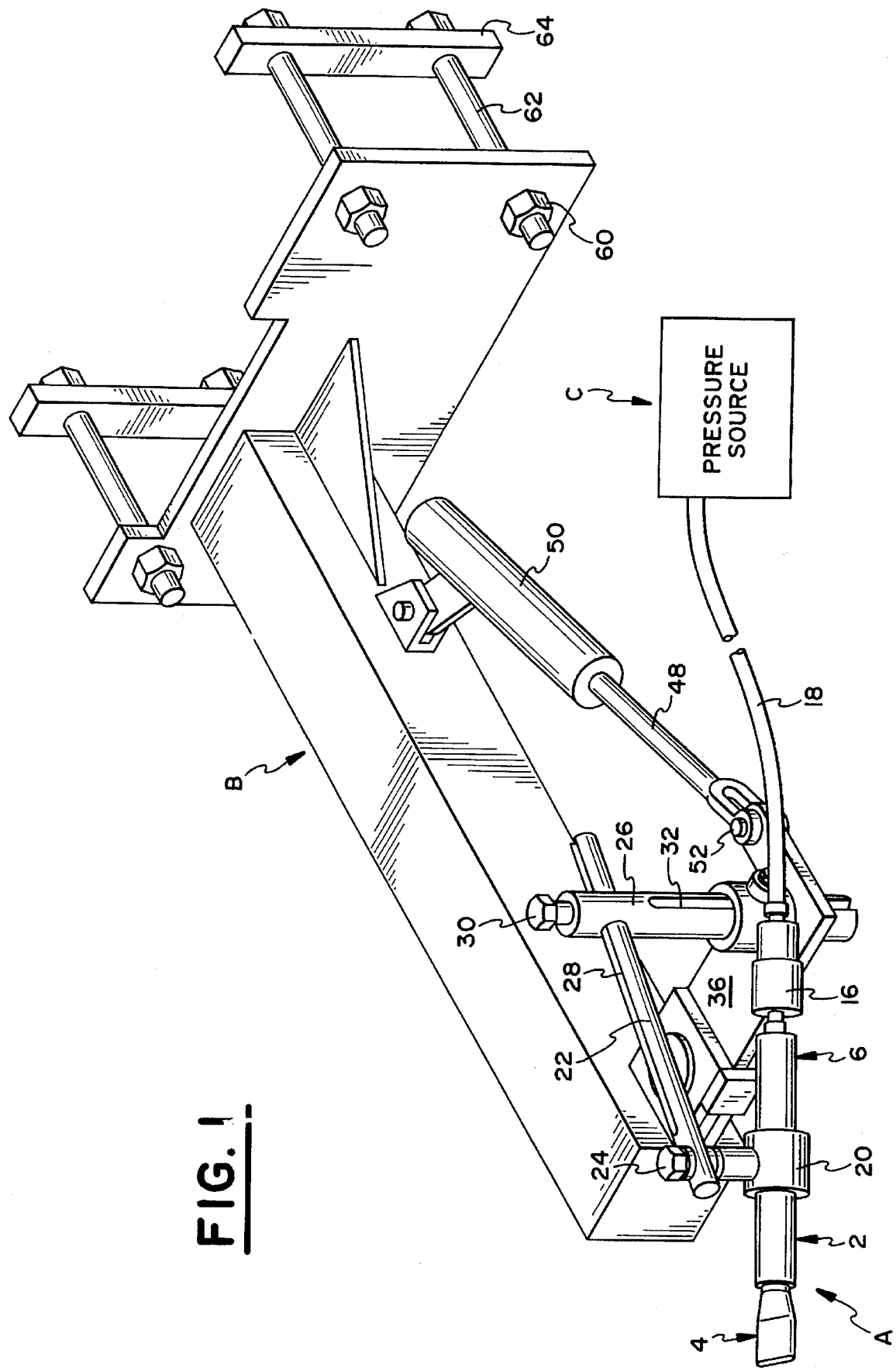
FIG. 1 is a perspective view of the nozzle assembly and corresponding support bracket formed in accordance with the preferred embodiment of the present invention.
Figure 2:
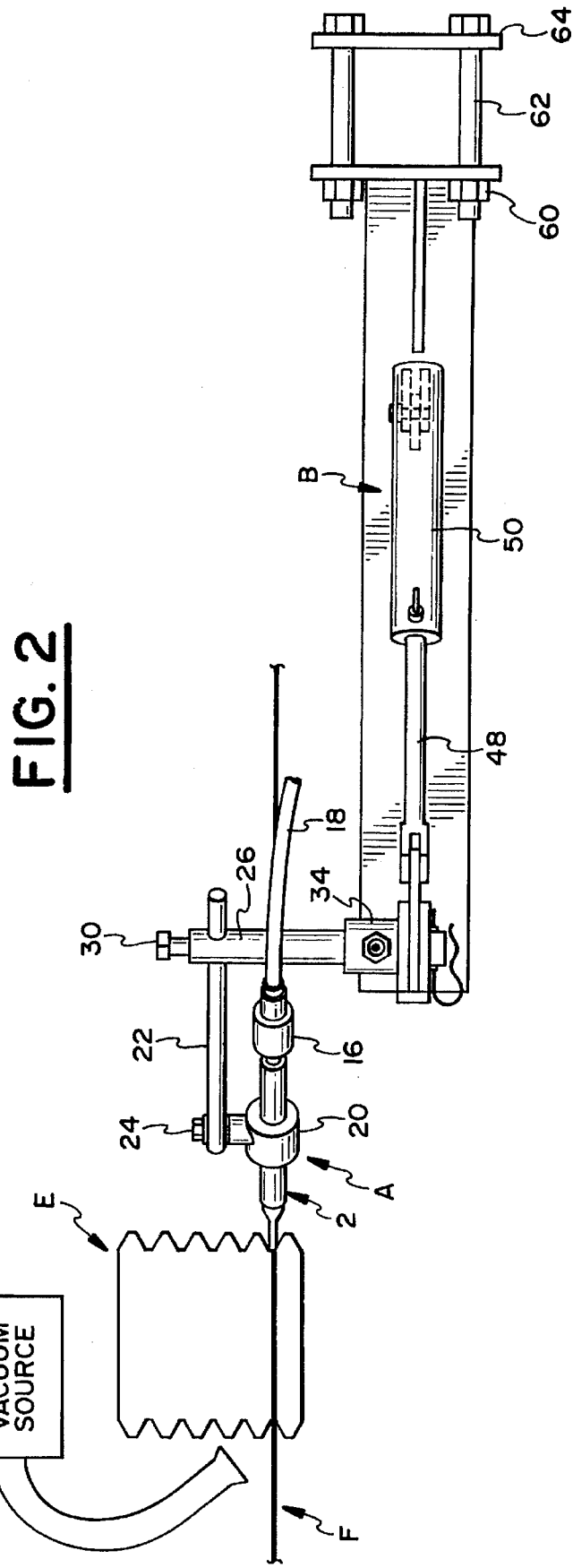
FIG. 2 is a front elevational view of the nozzle assembly and corresponding support bracket depicted in FIG. 1 as well as a portion of a conventional multiple head band saw.

Referring to FIGS. 1 and 2, the dust removal system of the present invention includes a nozzle assembly A, a removably mounted support bracket B, a pressure source C and a vacuum source D. The dust removal system of the present invention is preferably used with a conventional multiple head band saw for forming pallet stock such as the GOLDEN EAGLE MULTI-HEAD BAND SAW sold by Brewer, Inc. Since multiple head band saws for forming pallet stock are readily known to those in the industry, such will not be shown or described herein in detail. Rather, only the relevant portions of the multiple head band saws will be shown and/or described herein. It should be understood that while the dust removal system is preferably used with multi-head band saws for forming pallets it can be readily adapted for numerous other industries and machines.

The nozzle assembly includes a nozzle 2 having first and second ends 4 and 6. As seen in FIG. 2, the first end 4 of nozzle 2 is positioned adjacent the workpiece E and the saw blade F. Saw blade F is a conventional endless band saw blade (only a portion of which is shown) used in multiple head band saws. As readily seen in FIG. 2, the cutting portion of the saw blade extends in substantially a horizontal plane. Further, the first end 4 of nozzle 2 is positioned in substantially the same horizontal plane as the cutting portion of saw blade F.

Figure 5:
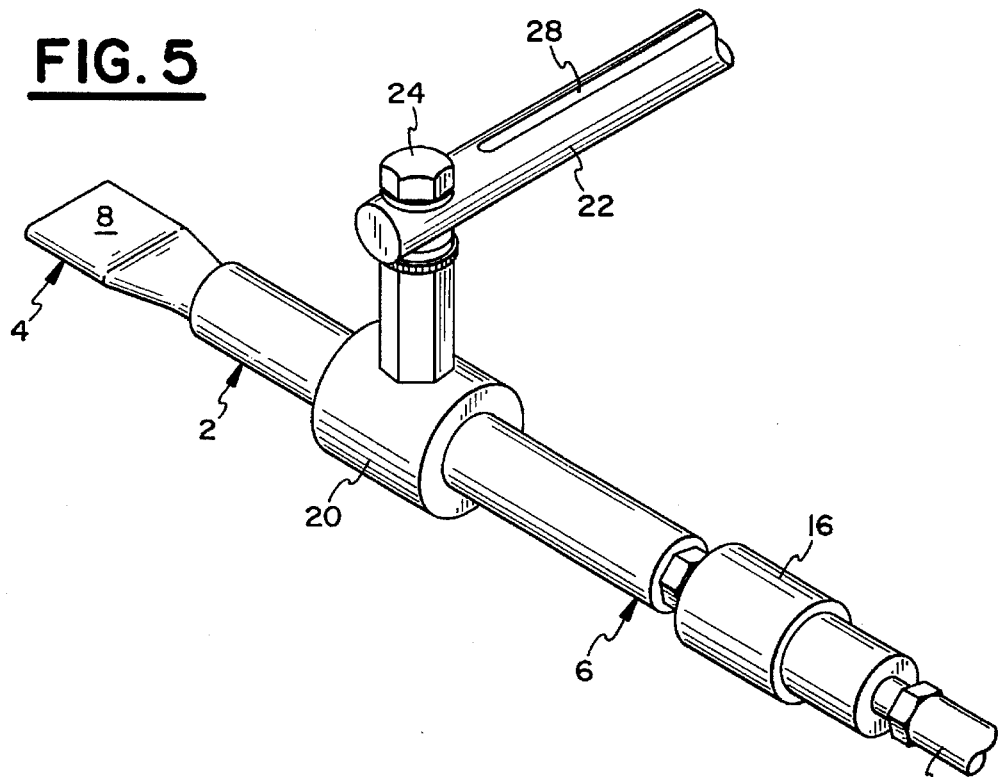
FIG. 5 is a fragmentary perspective view of the nozzle assembly.
Figure 6:
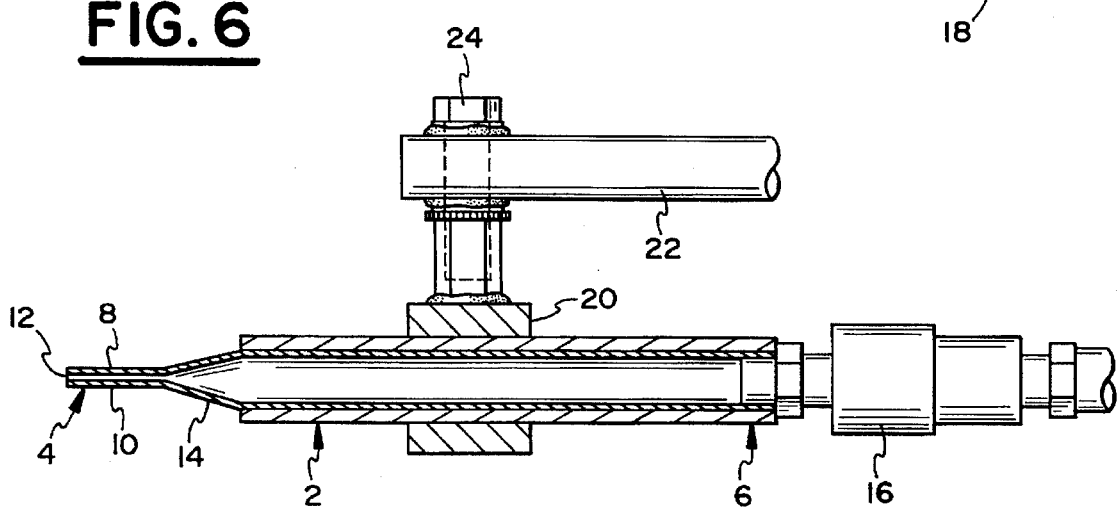
FIG. 6 is a fragmentary elevational view of the nozzle.

Referring to FIGS. 5 and 6, the first end 4 of nozzle 2 includes an upper surface 8 and a lower surface 10. As seen in FIG. 6, the upper surface 8 extends substantially parallel to lower surface 10. An opening 12 is formed in the first end 4 of nozzle 2. The nozzle 2 further includes a tapered portion 14. The second end 6 of nozzle 2 is connected to pressure source C via a coupling 16 and conduit 18, as seen in FIG. 1. The second end 6 has a substantially circular cross-section.

Nozzle 2 is slidably positioned in support collar 20. Although not shown, support collar 20 includes a bore and a conventional screw for maintaining the nozzle 2 in a desired position. Upon loosening of the screw of support collar 20, the nozzle 2 may be slid to the desired position. Support collar 20 is adjustably mounted to support shaft 22 via screw 24.

Figure 7A:
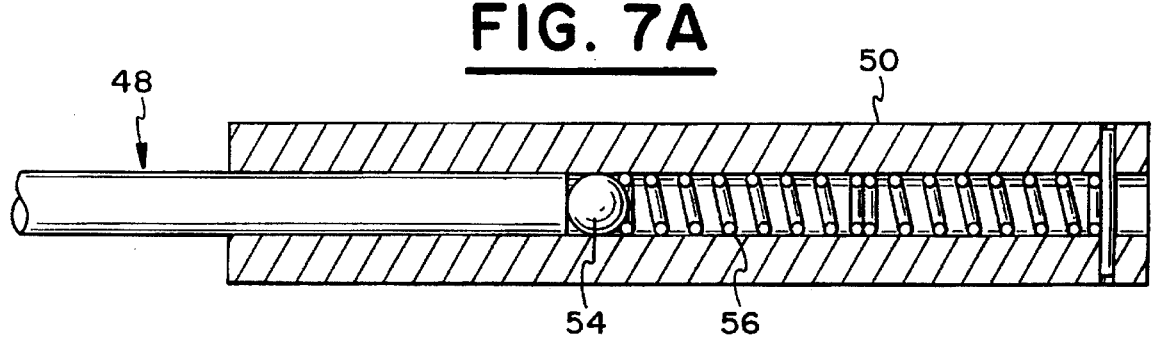
FIGS. 7A–7D are views illustrating various components of the nozzle assembly and corresponding supporting bracket.
Figure 7B:
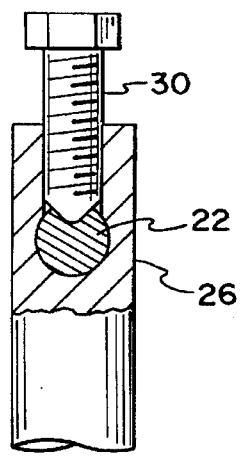
Figure 7C:
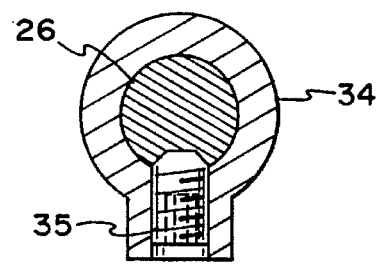

Upon loosening of screw 24, the angular position of nozzle 2 relative to the workpiece may be varied to the desired position. In other words, the nozzle 2 may be rotated about the axis of screw 24 to vary the angular position of the nozzle with respect to the workpiece. As seen in FIGS. 1 and 2, support shaft 22 extends substantially horizontally and is slidably mounted in a bore of support shaft 26. Support shaft 22 includes a longitudinally extending groove 28 which receives screw 30, see FIGS. 1 and 7B. It will be readily appreciated that upon loosening of screw 30, support shaft 22 may be slid to the desired position. Similarly, the vertically oriented support shaft 26 includes a longitudinally extending bore 32 and is received in collar 34. Collar 34 includes a bore and screw 35 to permit adjustment of the support shaft 26 which in turn permits adjustment of the height of nozzle 2 relative to the workpiece as seen in FIGS. 1 and 7C. This is important because it allows the nozzle assembly to be readily adapted for any blade of a multiple head band saw the height of which varies.

Figure 7D:
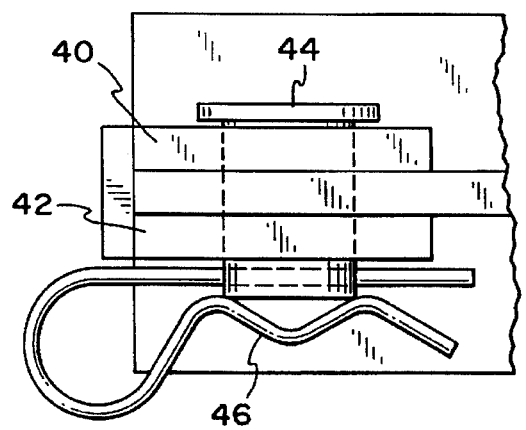

Referring to FIG. 1, collar 34 is mounted on the pivot arm 36 of support bracket B. The pivot arm 36 includes an opening aligned with the bore of collar 34 to permit the lower portion of support shaft 26 to pass therethrough. The pivot arm 36 is pivotally connected to support arm 38 of bracket B. As seen in FIGS. 1 and 7D, the pivot arm 38 is positioned between a pair of flanges 40 and 42. Pin 44 passes through flanges 40 and 42 as well as pivot arm 36. A key 46 locks pin 44 in place.

A piston 48 and cylinder 50 are pivotally connected to pivot arm 36 adjacent collar 34 via pin 52 and a key (not shown). Referring to FIG. 7A, cylinder 50 includes a ball 54 and spring 56 to bias arm 36 in the position shown in FIG. 1. As readily seen by the dotted lines in FIG. 4, the piston 48 and cylinder 50 permit the nozzle to be moved away from the workpiece. This feature is advantageous in that the nozzle assembly A can retract upon impact from a foreign object without being damaged.

The support bracket B includes a base 58 which is removably mounted to a multiple head band saw. Preferably, the base 58 is mounted to a horizontally extending rectangular shaped portion of a multiple head band saw via nuts 60, bolts 62 and backing plates 64. It will be readily appreciated that the configuration of the support bracket B may be varied to accommodate variances in configuration of conventional multiple head band saws.

OPERATION

Figure 3:
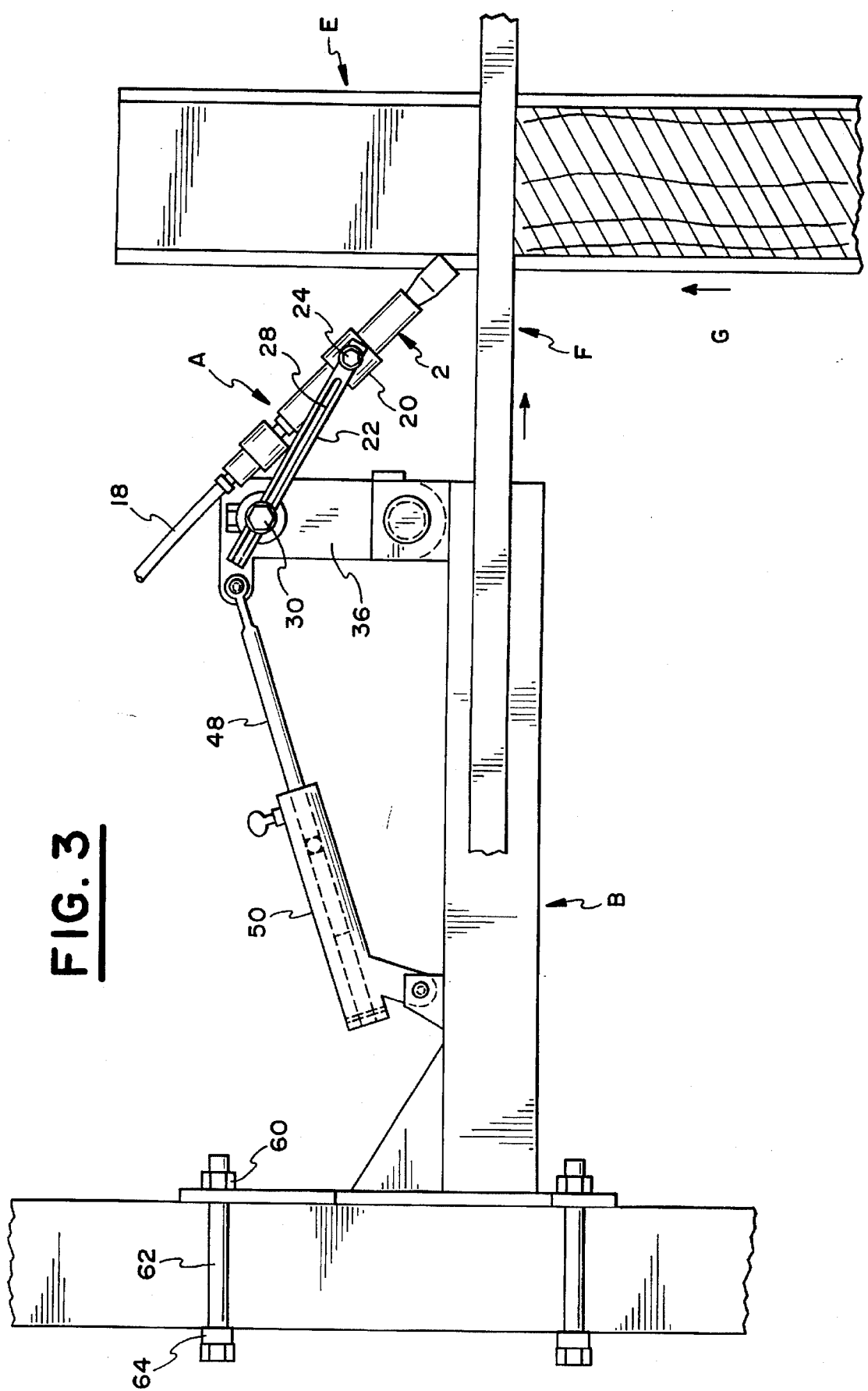
FIG. 3 is a plan view of the nozzle assembly and corresponding support bracket of FIG. 1 as well as a portion of a conventional multiple head band saw.
Figure 4:
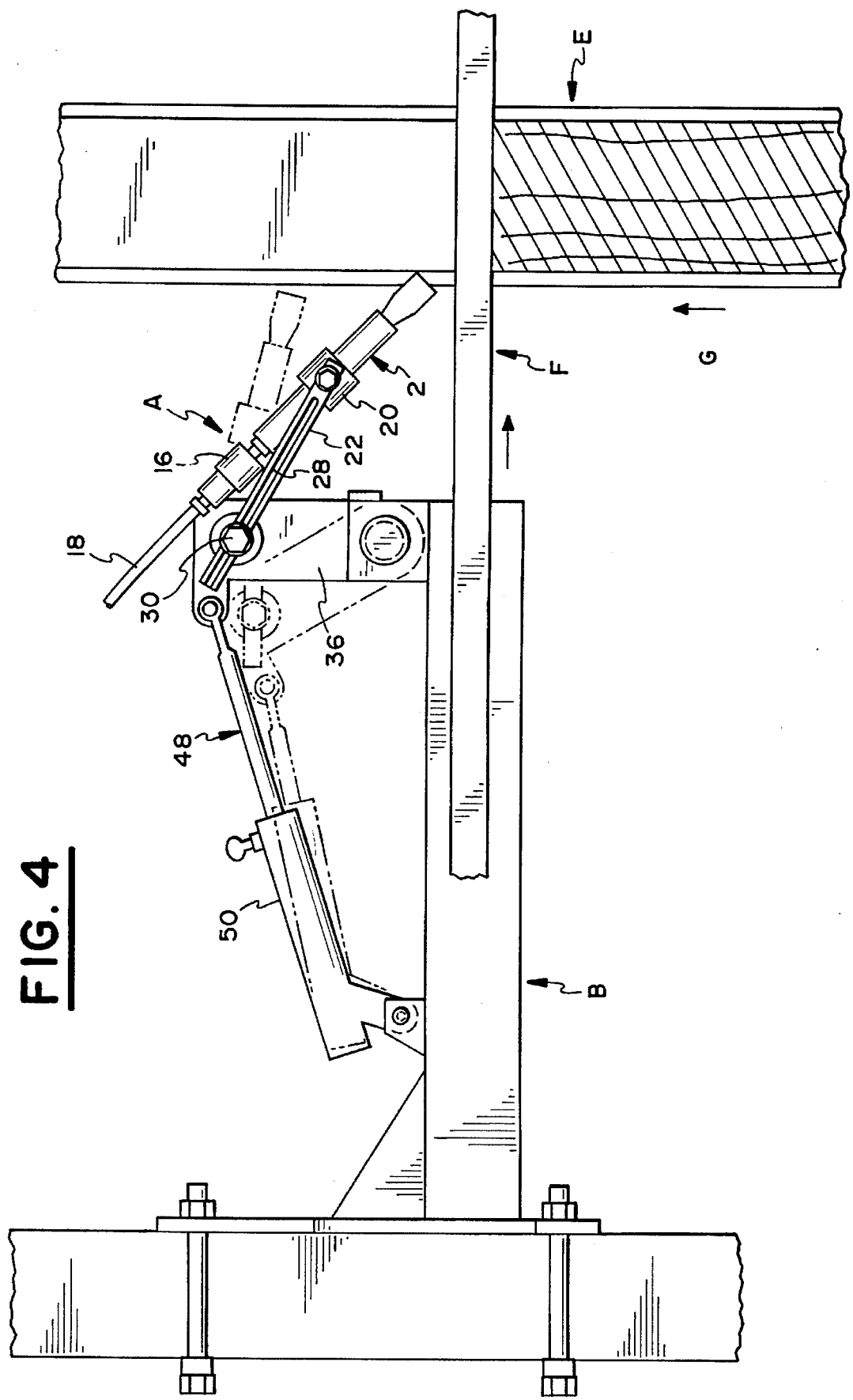
FIG. 4 is a plan view similar to that of FIG. 3.

The preferred method of operating the subject dust removal system will be hereinafter described. A nozzle assembly A is mounted adjacent each saw blade of a multiple head band saw. More specifically, the nozzle 2 should be positioned in substantially the same horizontal plane as the saw blade and downstream thereof relative to the direction of travel G of the workpiece E, as seen in FIG. 3. Further, nozzle 2 is oriented such that at least a portion thereof will extend into the kerf of the workpiece formed by the saw blade. The configuration of end 4 of nozzle 2 readily permits at least a portion of the nozzle 2 to extend into the kerf. It will be readily appreciated that the desired position of nozzle 2 relative to a particular workpiece may be accomplished by slidably adjusting nozzle 2, support shaft 22 and support shaft 26.

While the multiple head band saw is operating, the pressure source C is energized to provide air at approximately 100 psi to nozzle 2. In this manner, nozzle 2 directs air at a predetermined pressure into the kerf. While air is being directed into the kerf, the vacuum source D operates to suction sawdust out of the kerf. The vacuum source D is of conventional construction and commonly located in the housing for each saw blade of a multiple head band saw. In this manner, a push-pull effect is achieved virtually eliminating sawdust from the kerf of a workpiece.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

What is claimed is:

1. An apparatus for removing sawdust from a kerf of a workpiece resulting from a saw blade having a cutting portion extending in substantially a horizontal plane cutting the workpiece, comprising:

a) a nozzle for providing a fluid at a predetermined pressure in a kerf of a workpiece, said nozzle having first and second ends, said first end of said nozzle being adapted to be positioned adjacent the kerf of a workpiece; and, b) a support member operably associated with said nozzle for supporting said nozzle adjacent a saw blade having a cutting portion extending in substantially a horizontal plane, said support member supports said first end of said nozzle in substantially the same horizontal plane as the saw blade and the kerf of the workpiece.

2. An apparatus as in claim 1, wherein:
   a) said support member supports said first end of said nozzle in substantially the same horizontal plane as the saw blade.

3. An apparatus as in claim 1, wherein:
   a) said support member supports said first end of said nozzle downstream of the saw blade relative to the direction of travel of the workpiece while being cut by the saw blade.

4. An apparatus as in claim 1, wherein:
   a) said support member includes means for adjusting the position of said nozzle relative to the workpiece.

5. An apparatus as in claim 1, wherein:
   a) said second end of said nozzle has a substantially circular cross-section.

6. An apparatus as in claim 1, wherein:
   a) said support member includes means for biasing said first end of said nozzle into the kerf of the workpiece.

7. An apparatus for removing sawdust from a kerf of a workpiece, comprising:
   a) a nozzle for providing fluid at a predetermined pressure in a kerf of a workpiece, said nozzle having first and second ends, said first end of said nozzle being tapered so that said first end can be inserted at least partially into the kerf of a workpiece; and,
   b) a support member operably associated with said nozzle for supporting said nozzle adjacent a saw blade and at least partially in the kerf of a workpiece.

8. An apparatus as in claim 7, wherein:
   a) said support member supports said first end of said nozzle in substantially the same horizontal plane as the saw blade.

9. An apparatus as in claim 7, wherein:
   a) said support member supports said first end of said nozzle downstream of the saw blade relative to the direction of travel of the workpiece while being cut by the saw blade.

10. An apparatus as in claim 7, wherein:
    a) said support member includes means for adjusting the position of said nozzle relative to the workpiece.

11. An apparatus as in claim 7, wherein:
    a) said support member includes means for biasing said first end of said nozzle into the kerf of the workpiece.

12. A system for removing sawdust from a kerf of a workpiece, comprising:
    a) a nozzle for directing a fluid at a predetermined pressure in a kerf of a workpiece;
    b) a pressure source for providing a fluid at a predetermined pressure to said nozzle;
    c) means for connecting said pressure source to said nozzle;
    d) a vacuum source for suctioning sawdust from the kerf of the workpiece;
    e) means for adjusting the position of said nozzle relative to the workpiece; and
    f) a support member operably associated with said nozzle for supporting said nozzle adjacent a saw blade having a cutting portion extending in substantially a horizontal plane, said support member supports said first end of said nozzle in substantially the same horizontal plane as the saw blade.

13. An apparatus as in claim 12, wherein:
    a) said nozzle includes first and second ends, said first end includes upper and lower surfaces each of which extends substantially horizontally.

14. An apparatus as in claim 13, further including:
    a) means for biasing said first end of said nozzle into the kerf of a workpiece.

15. An apparatus as in claim 13, wherein:
    a) said nozzle includes first and second ends, said first end is tapered to permit insertion into the kerf.

16. An apparatus as in claim 13, wherein:
    a) said positioning means includes a first support shaft having a longitudinally extending groove.

17. An apparatus as in claim 16, wherein:
    a) said positioning means includes a screw having first and second ends, said first end is positioned in said longitudinally extending groove of said first support shaft.

18. A method for removing sawdust from a kerf of a workpiece comprising the steps of:
    a) providing a nozzle for directing a fluid of a predetermined pressure into a kerf of a workpiece;
    b) providing a pressure source for providing fluid at a predetermined pressure to the nozzle;
    c) providing means for connecting the pressure source to the nozzle;
    d) providing a vacuum source for suctioning sawdust from the kerf of the workpiece;
    e) positioning the nozzle downstream of a saw blade relative to the direction of travel of the workpiece while being cut by the saw blade;
    f) positioning a cutting portion of the saw blade in substantially a horizontal plane;
    g) positioning at least a portion of the nozzle in substantially the same horizontal plane as the cutting portion of the saw blade; and;
    h) directing fluid into the kerf while simultaneously suctioning sawdust from the kerf.

19. A method as recited in claim 18, including the further step of:
    a) directing fluid into the kerf while simultaneously suctioning sawdust from the kerf.

20. An apparatus for removing sawdust from a kerf of a workpiece, comprising:
    a) a nozzle for providing a fluid at a predetermined pressure in a kerf of a workpiece, said nozzle having first and second ends, said first end of said nozzle being adapted to be positioned adjacent the kerf of a workpiece;
    b) a connecting hose for connecting said second end of said nozzle to a pressure source; and,
    c) a support member operably associated with said nozzle for supporting said nozzle adjacent a saw blade; and
    d) means for biasing said first end of said nozzle into the kerf of a workpiece.

* * * * *